Patented Nov. 15, 1938

2,136,455

UNITED STATES PATENT OFFICE 2,136,455

DIESEL FUEL

Robert C. Moran, Wenonah, and Everett W. Fuller and George S. Crandall, Woodbury, N. J., assignors to Socony-Vacuum Oil Company, Incorporated, New York, N. Y., a corporation of New York No Drawing. Application August 11, 1936, Serial No. 95,422. Renewed June 2, 1938

2 Claims. (Cl. 44—9)

This invention has to do with fuels for internal combustion engines of the Diesel type, and is concerned with the modification of such fuels by the addition of characterizing ingredients for the purpose of modifying and/or controlling the combustion characteristics of the fuel.

The requirements of a Diesel cycle engine call for a fuel whose ignition and combustion characteristics are the opposite of those usually desired in an Otto cycle internal combustion engine as typified by the usual spark-ignition gasoline engine. The desired combustion in an ordinary gasoline engine is one of a controlled or controllable slowness, since too rapid ignition causes the phenomena usually characterized by the inclusive term "knocking." In the Diesel cycle engine, the desired characteristics are diametrically opposite, and enhanced speed of ignition is desired. Here the fuel is injected into a combustion space and it may exert maximum efficiency only when the delay period between injection and ignition is as short as possible. Improperly delayed ignition in a Diesel engine also gives rise to phenomena known as "knocking" due to improper coordination of combustion phenomena and cylinder conditions, although the reason for such knocking is the reverse of that for knocking in gasoline engines of ordinary type.

This invention has to do with the use of novel characterizing ingredients in Diesel fuel tending to promote rapidity of combustion and so control the characteristics of the fuel.

This invention has for its object the improvement of Diesel fuels by the addition of certain compounds whose presence in small quantities promotes the rapidity of combustion of such fuels.

The novel Diesel fuels herein disclosed are characterized by the presence of small amounts of an organic amino derivative of benzene, viz, the triazene compound diazo-amino-benzene, as a combustion accelerator, and comprise not only the distillates of the kerosene-like boiling range commonly denoted as Diesel fuel, but extend as well into the field of hydrocarbon products both heavier and lighter, as, for example, light and heavy fuel oils for use in Diesel engines, and gasoline for use in Diesel cycle gasoline engines.

Knocking characteristics of gasoline for use in Otto cycle engines of ordinary type are normally expressed in terms of octane number, after an accepted usage in the art. Knocking characteristics of Diesel fuel are at present best expressed by "cetane" numbers. The cetane number is the per cent by volume of cetane in a blend of cetane and alpha-methylnaphthalene, which blended fuel has the same combustion characteristics as the fuel under test. (Boerlage and Broeze, J. Soc. Automotive Eng. 31, 283-93 (1932). A. S. T. M. Proc. 35, I, 340 (1935). An increase in cetane number indicates a decrease in delay between fuel injection and fuel ignition and consequently indicates a betterment in fuel combustion characteristics.

A number of compounds have been proposed as ignition accelerators for Diesel fuels. Among them are such materials as ethyl nitrate, amyl nitrite and certain aldehydes and peroxides. Many of these compounds are unsatisfactory from a standpoint of stability, cost, toxicity or tendency to form corrosive gases in the combustion chamber of the engine.

According to the present invention, Diesel fuels may be altered in combustion characteristics by the addition of small amounts of diazoamino-benzene.

Diazo-amino-benzene is a compound containing the triazene radical —N:N·NH— and has the formula $C_6H_5·N:N·NH·C_6H_5$, and may be prepared readily by coupling aniline with benzene diazonium chloride with separation of HCl, as described in "Organic Synthesis" Vol. XIV, page 24. It is a solid, melting at about 96° C., and sufficiently soluble in oil for the purposes of this invention.

As an example of the efficiency of this ingredient in the improvement of Diesel fuel, the following tests are noted, in which the indicated percentages of the novel ingredient were added to a distillate Diesel fuel of the type commonly known as No. 2 furnace oil, having a specific gravity of 0.8478, a flash point of 160° F., and a Lovibond color of 0.7.

Tests of Diesel fuels

| | Cetane number |
|---|---|
| Fuel oil alone | 50.0 |
| Fuel plus 0.5% diazo-amino-benzene | 53.5 |
| Fuel plus 1.0% diazo-amino-benzene | 59.0 |
| Fuel plus 2.0% diazo-amino-benzene | 63.0 |

These tests indicate that the addition of diazo-amino-benzene appreciably improves the ignition quality of Diesel fuels.

This compound may be used in amounts varying with the amount of improvement desired in the fuel. It may be used in proportions up to about 5.0% of the fuel, but in general, lower concentrations, for instance about 1.0% are preferred.

In the following claims, the term "Diesel fuel" means any, and includes all types of hydrocarbon products intended for use in any engine operating according to the Diesel cycle.

We claim:

1. An improved Diesel fuel comprising a mineral hydrocarbon fuel and in admixture therewith a minor proportion of diazo-amino-benzene, sufficient to decrease the ignition delay period of the fuel.

2. An improved Diesel fuel comprising a mineral hydrocarbon fuel and in admixture therewith not in excess of 5.0% of diazo-amino-benzene, sufficient to decrease the ignition delay period of the fuel.

ROBERT C. MORAN.
EVERETT W. FULLER.
GEORGE S. CRANDALL.